United States Patent [19]
Tucholski

[11] Patent Number: 6,060,192
[45] Date of Patent: May 9, 2000

[54] COLLECTOR ASSEMBLY FOR AN ELECTROCHEMICAL CELL INCLUDING AN INTEGRAL SEAL/INNER COVER

[75] Inventor: Gary R. Tucholski, Parma Heights, Ohio

[73] Assignee: Eveready Battery Company, Inc., St. Louis, Mo.

[21] Appl. No.: 09/036,208

[22] Filed: Mar. 6, 1998

[51] Int. Cl.[7] .............................. H01M 2/12; H01M 2/08
[52] U.S. Cl. .............................. 429/56; 429/57; 429/171; 429/185
[58] Field of Search ................ 429/56, 57, 163, 429/171, 172, 174, 185, 177

[56] References Cited

U.S. PATENT DOCUMENTS

| | | |
|---|---|---|
| 3,218,197 | 11/1965 | Carmichael et al. . |
| 4,079,172 | 3/1978 | Potts et al. . |
| 4,581,304 | 4/1986 | Beatty et al. .............................. 429/56 |
| 4,931,368 | 6/1990 | Ayers et al. ................... 429/53 |
| 5,173,379 | 12/1992 | Ichinose et al. ......................... 429/174 |
| 5,227,261 | 7/1993 | Georgopoulos ........................... 429/56 |
| 5,248,568 | 9/1993 | Getz ............................................ 429/56 |
| 5,272,020 | 12/1993 | Flack ........................................ 429/141 |
| 5,693,430 | 12/1997 | Iwatsu et al. .............................. 429/72 |

Primary Examiner—Maria Nuzzolillo
Assistant Examiner—Tracy Dove
Attorney, Agent, or Firm—Robert W. Welsh; Stewart A. Fraser

[57] ABSTRACT

An electrochemical cell constructed in accordance with the present invention includes a can for containing electrochemical materials including positive and negative electrodes and an electrolyte, the can having an open end and a closed end; an integral seal/inner cover assembly positioned in the open end of the can, the integral seal/inner cover assembly having a rigid inner cover and a seal preformed directly onto at least an inner-facing surface of the rigid inner cover; a collector extending through a central hole provided in the integral seal/inner cover assembly and into the can so as to contact one of the electrodes; and an outer cover positioned across the open end of the can proximate an outer-facing surface of the rigid inner cover, the outer cover being positioned so as to be in electrical contact with the collector. The rigid inner cover preferably includes at least one aperture extending from the inner-facing surface to the outer-facing surface of the inner cover. The aperture being filled by the seal to provide a pressure relief that relieves internal pressure from the can when the internal pressure becomes excessive. Preferably, the seal is made of rubber and is molded directly onto the rigid inner cover.

26 Claims, 7 Drawing Sheets

COLLECTOR ASSEMBLY FOR AN ELECTROCHEMICAL CELL INCLUDING AN INTEGRAL SEAL/INNER COVER

BACKGROUND OF THE INVENTION

The present invention generally relates to an electrochemical cell construction. More particularly, the present invention relates to the construction of a collector assembly used for an electrochemical cell, such as an alkaline cell.

FIG. 1 shows the construction of a conventional C-sized alkaline cell 10. As shown, cell 10 includes a cylindrically-shaped can 12 having an open end and a closed end. Can 12 is preferably formed of an electrically-conductive material such that an outer cover (not shown) welded to a bottom surface 14 at the closed end of can 12, serves as an electrical contact terminal for the cell.

Cell 10 further typically includes a first electrode material 15, which may serve as the positive electrode (also known as a cathode). The first electrode material 15 may be preformed and inserted into can 12, or may be molded in place so as to contact the inner surfaces of the can 12. For an alkaline cell, first electrode material 15 will typically include $MnO_2$. After the first electrode 15 has been provided in can 12, a separator 17 is inserted into the space defined by first electrode 15. Separator 17 is preferably a non-woven fabric. Separator 17 is provided to maintain a physical separation of the first electrode material 15 and a mixture of electrolyte and a second electrode material 20 while allowing the transport of ions between the electrode materials.

Once separator 17 is in place within the cavity defined by first electrode 15, an electrolyte is dispensed into the space defined by separator 17 along with the mixture 20 of electrolyte and a second electrode material, which may be the negative electrode (also known as the anode). The electrolyte/second electrode mixture 20 preferably includes a gelling agent. For a typical alkaline cell, mixture 20 is formed of a mixture of an aqueous KOH electrolyte and zinc, which serves as the second electrode material. Water and additional additives may also be included in mixture 20.

Once the first electrode 15, separator 17, the electrolyte, and mixture 20 have been formed inside can 12, a preassembled collector assembly 25 is inserted into the open end of can 12. Can 12 is typically slightly tapered to have a larger diameter at its open end. This taper serves to support the collector assembly in a desired orientation prior to securing it in place. After collector assembly 25 has been inserted, an outer cover 45 is placed over collector assembly 25. Collector assembly 25 and outer cover 45 are secured in place by radially squeezing and crimping the peripheral lip of collector assembly 25 and outer cover 45 within the end edge 13 of can 12. As described further below, the primary function served by collector assembly 25 is to provide for a second external electrical contact for the electrochemical cell. Additionally, collector assembly 25 must seal the open end of can 12 to prevent the electrochemical materials therein from leaking from this cell. Additionally, collector assembly 25 must exhibit sufficient strength to withstand the physical abuse to which batteries are typically exposed. Also, because electrochemical cells may produce hydrogen gas, collector assembly 25 preferably allows the internally-generated hydrogen gas to permeate therethrough to escape to the exterior of the electrochemical cell. Further, collector assembly 25 should include some form of pressure relief mechanism to relieve pressure produced internally within the cell should this pressure become excessive. Such conditions may occur when the electrochemical cell internally generates hydrogen gas at a rate that exceeds that at which the internally-generated hydrogen gas can permeate through the collector assembly to the exterior of the cell.

The collector assembly 25 shown in FIG. 1 includes a seal 30, a collector nail 40, an inner cover 44, a washer 50, and a plurality of spurs 52. Seal 30 is shown as including a central hub 32 having a hole through which collector nail 40 is inserted. Seal 30 further includes a V-shaped portion 34 that may contact an upper surface 16 of first electrode 15.

Seal 30 also includes a peripheral upstanding wall 36 that extends upward along the periphery of seal 30 in an annular fashion. Peripheral upstanding wall 36 not only serves as a seal between the interface of collector assembly 25 and can 12, but also serves as an electrical insulator for preventing an electrical short from occurring between the positive can and negative contact terminal of the cell.

Inner cover 44, which is formed of a rigid metal, is provided to increase the rigidity and supports the radial compression of collector assembly 25 thereby improving the sealing effectiveness. As shown in FIG. 1, inner cover 44 is configured to contact central hub portion 32 and peripheral upstanding wall 36. By configuring collector assembly 25 in this fashion, inner cover 44 serves to enable compression of central hub portion 32 by collector nail 40 while also supporting compression of peripheral upstanding wall 36 by the inner surface of can 12.

Outer cover 45 is typically made of a nickel-plated steel and is configured to extend from a region defined by the annular peripheral upstanding wall 36 of seal 30 and to be in electrical contact with a head portion 42 of collector nail 40. Typically, outer cover 45 is welded to head portion 42 of collector nail 40 to prevent any loss of contact. As shown in FIG. 1, when collector assembly 25 is inserted into the open end of can 12, collector nail 40 penetrates deeply within the electrolyte/second electrode mixture 20 to establish sufficient electrical contact therewith. In the example shown in FIG. 1, outer cover 45 includes a peripheral lip 47 that extends vertically upward along the circumference of outer cover 45. By forming peripheral upstanding wall 36 of seal 30 of a length greater than that of peripheral lip 47, a portion of peripheral upstanding wall 36 may be folded over peripheral lip 47 during the crimping process so as to prevent any portion of the upper edge 13 of can 12 from coming into contact with outer cover 45.

Seal 30 is preferably formed of nylon. In the configuration shown in FIG. 1, a pressure relief mechanism is provided for enabling the relief of internal pressure when such pressure becomes excessive. Further, inner cover 44 and outer cover 45 are typically provided with apertures that allow the hydrogen gas to escape to the exterior of cell 10. The mechanism shown includes an annular metal washer 50 and a plurality of spurs 52 that are provided between seal 30 and inner cover 44. The plurality of spurs 52 each include a pointed end 53 that is pressed against a thin intermediate portion 38 of seal 30. Spurs 52 are biased against the lower inner surface of inner cover 44 such that when the internal pressure of cell 10 increases and seal 30 consequently becomes deformed by pressing upward toward inner cover 44, the pointed ends 53 of spurs 52 penetrate through the thin intermediate portion 38 of seal 30 thereby rupturing seal 30 and allowing the escape of the internally-generated gas.

Although the above-described collector assembly 25 performs all the above-noted desirable functions satisfactorily, as apparent from its cross-sectional profile, this particular collector assembly occupies a significant amount of space within the interior of the cell 10. Because the interior dimensions of the electrochemical cell are generally fixed, the greater the space occupied by the collector assembly, the less space that there is available within the cell for the electrochemical materials. Consequently, a reduction in the amount of electrochemical materials that may be provided within the cell results in a shorter service life for the cell. It is therefore desirable to design a collector assembly that occupies less space within the electrochemical cell.

It should be noted that the collector assembly construction shown in FIG. 1 is but one example of a cell construction. Other collector assemblies exist that have lower profiles and hence occupy less space within the cell. However, such collector assemblies typically achieve this reduction in occupied volume at the expense of the sealing characteristics of the collector assembly or the performance and reliability of the pressure relief mechanism. It is therefore desirable to construct a collector assembly that occupies a minimal amount of space within an electrochemical cell while still maintaining adequate sealing characteristics, and a reliable pressure relief mechanism.

SUMMARY OF THE INVENTION

Accordingly, it is an aspect of the present invention to solve the above problems by providing a collector assembly having a significantly lower profile and thereby occupying significantly less space within an electrochemical cell. Another aspect of the present invention is to provide a collector assembly exhibiting lower water permeability than prior assemblies thereby increasing the cell's shelf life. An additional aspect of the invention is to provide a collector assembly having a reliable pressure relief mechanism. Yet another aspect of the present invention is to provide a collector assembly having improved sealing characteristics. Still yet another aspect of the present invention is to provide a collector assembly that is simpler to manufacture and that requires less materials thereby possibly having lower manufacturing costs. Another aspect of the invention is to provide a collector assembly that requires less radial compressive force to be applied by the can to adequately seal the cell, thereby allowing for the use of a can having thinner sidewalls and thus resulting in greater internal cell volume. Yet another aspect of the invention is to provide a seal which will reseal to a lower vent pressure after the initial vent rather than remaining open as in conventional fail safe venting systems.

To achieve these and other aspects and advantages, an electrochemical cell of the present invention comprises a can for containing electrochemical materials including positive and negative electrodes and an electrolyte, the can having an open end and a closed end; an integral seal/inner cover assembly positioned in the open end of the can, the integral seal/inner cover assembly having a rigid inner cover and a seal preformed directly onto at least an inner-facing surface of the rigid inner cover; a collector extending through a central hole provided in the integral seal/inner cover assembly and into the can so as to contact one of the electrodes; and an outer cover positioned across the open end of the can proximate an outer-facing surface of the rigid inner cover, the outer cover being positioned so as to be in electrical contact with the collector. The rigid inner cover preferably includes at least one aperture extending from the inner-facing surface to the outer-facing surface of the inner cover. The aperture being filled by the seal to provide a pressure relief that relieves internal pressure from the can when the internal pressure becomes excessive. The seal may extend within the central hole of the rigid inner cover to prevent leakage of the electrochemical materials from between the collector and the rigid inner cover.

The seal may also be preformed onto a peripheral edge of the rigid inner cover to prevent leakage of the electrochemical materials from between the rigid inner cover and an inner surface of the can. Additionally, the seal may extend from the peripheral edge of the rigid inner cover past the outer-facing surface thereof to provide electrical insulation between the can and the outer cover. Preferably, the seal is made of rubber and is molded directly onto the rigid inner cover.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
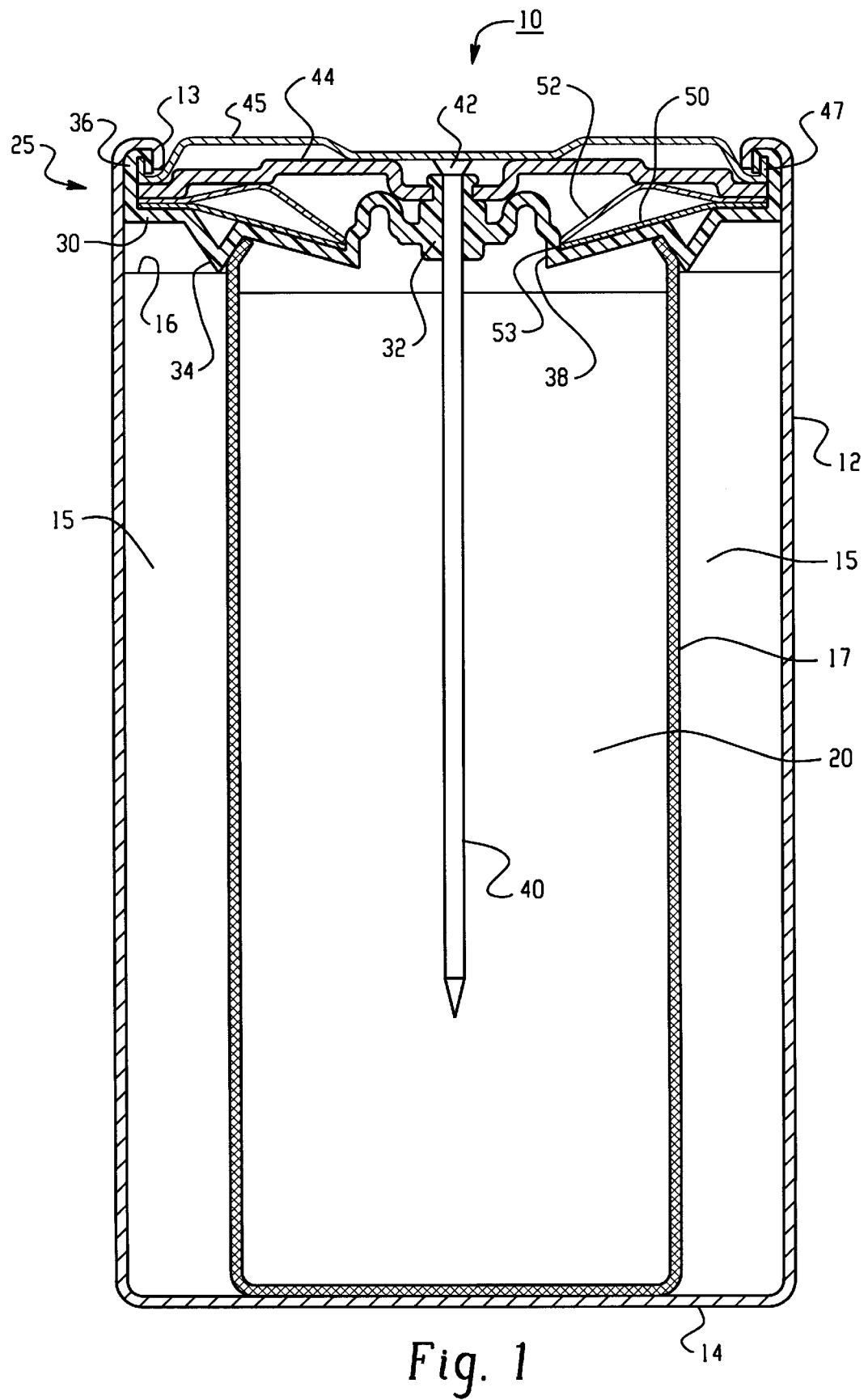
FIG. 1 is a cross section of a conventional C-sized alkaline electrochemical cell.
Figure 2:
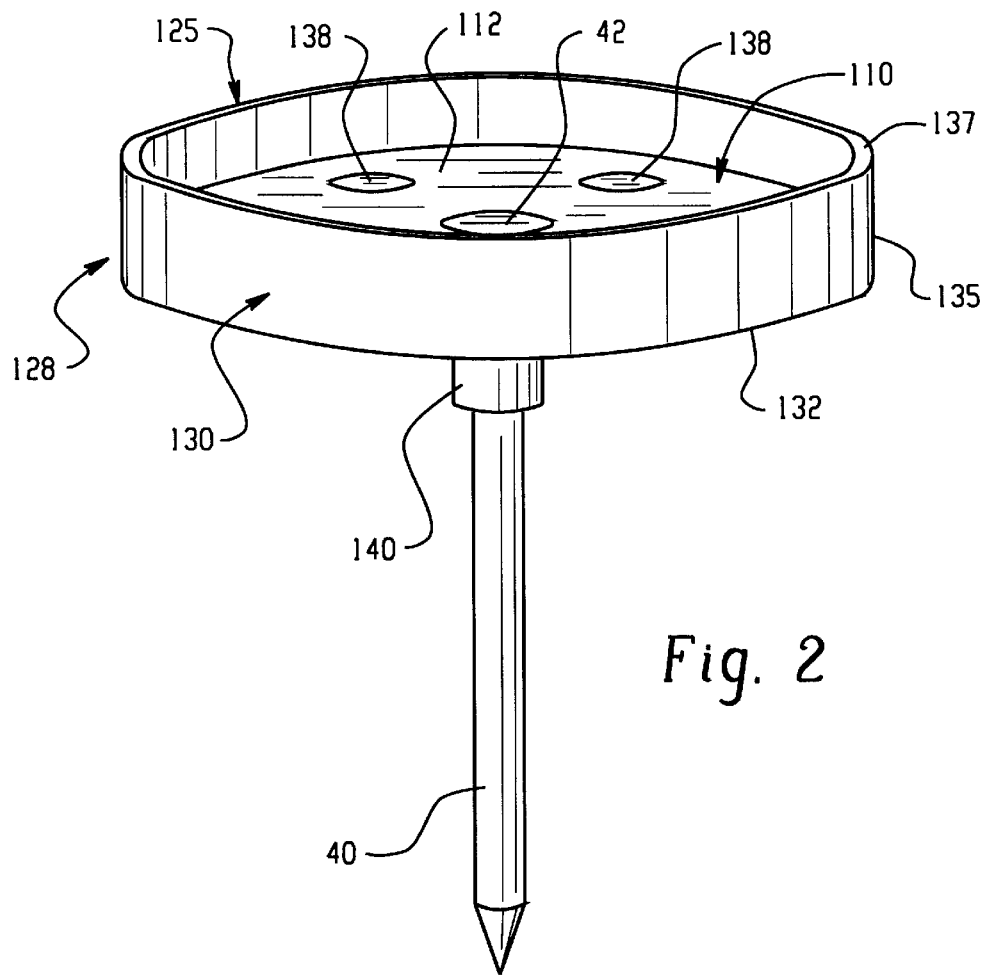
FIG. 2 is a perspective view of a collector assembly constructed in accordance with a first embodiment of the present invention.
Figure 3:
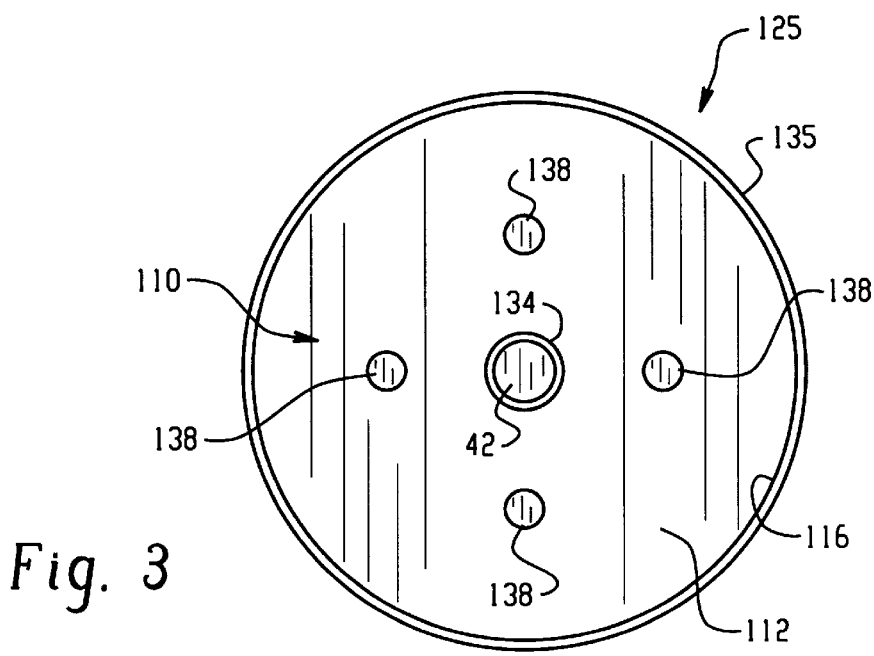
FIG. 3 is a top view of a collector assembly constructed in accordance with the first embodiment of the present invention.
Figure 4:
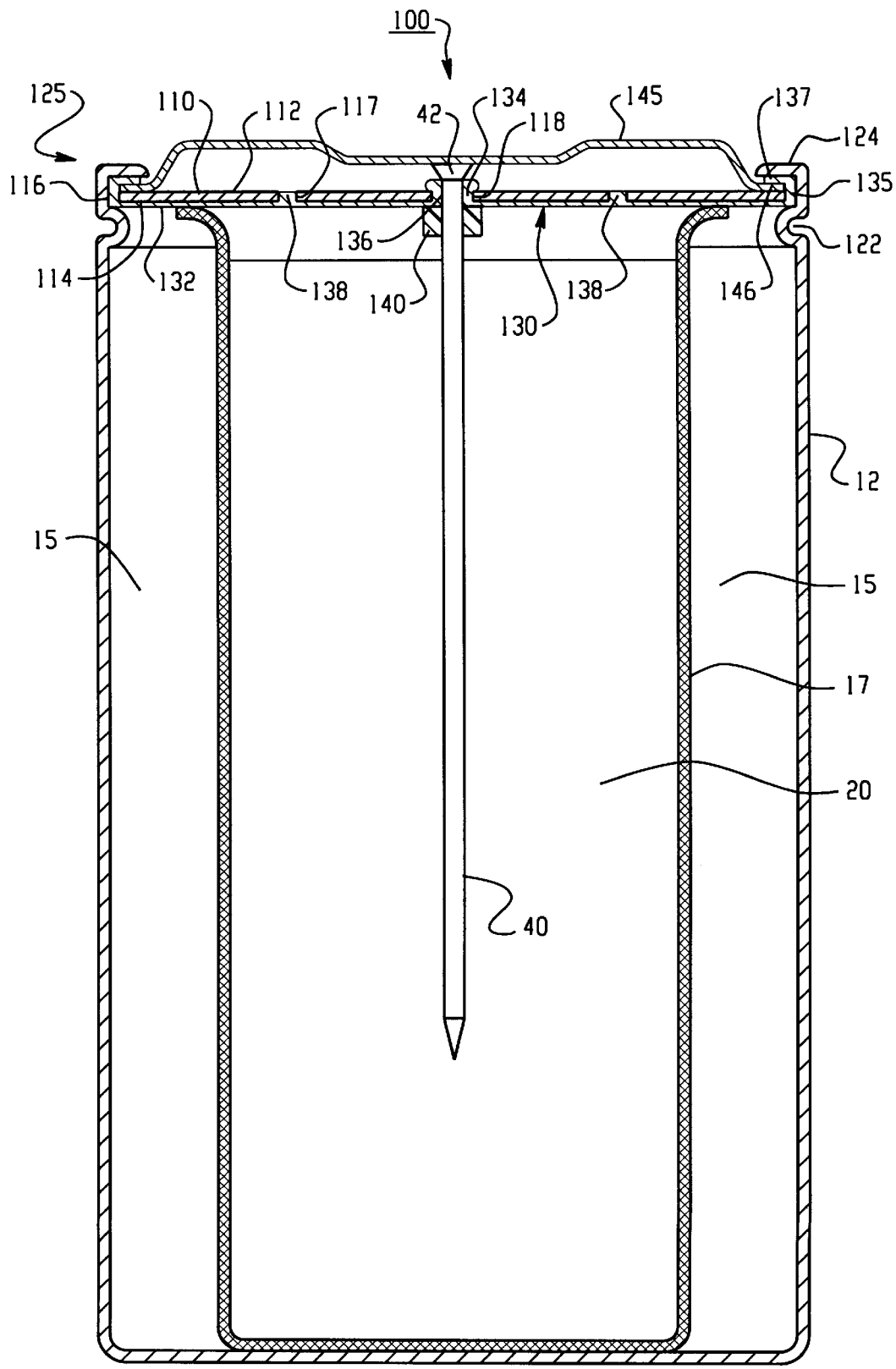
FIG. 4 is a cross-sectional view of a portion of an electrochemical cell into which the collector assembly constructed in accordance with the first embodiment of the present invention has been inserted.

FIGS. 2 and 3 show a collector assembly 125 constructed in accordance with a first embodiment of the present invention. FIG. 4 shows the manner in which collector 125 may be implemented in an electrochemical cell 100. Like the conventional cell 10 shown in FIG. 1, cell 100 also includes a cylindrical can 12 made of an electrically-conductive material. Also, a first electrode 15 is formed against the inner walls of can 12 preferably by molding. For an alkaline cell, first electrode material 15 preferably includes $MnO_2$. A separator 17 is likewise inserted within the cavity defined by first electrode material 15, and a mixture of a second electrode and electrolyte are provided within a cavity defined by the separator 17. Again, for an alkaline cell, mixture 20 preferably includes a KOH electrolyte, zinc second electrode material, and water. Additional additives may also be included in either the first or second electrodes to enhance the service life of the cell.

As shown in FIGS. 2–4, collector assembly 125 includes an integral seal/inner cover assembly 128, a retainer 140, and a collector nail 40 that passes through a central hole 136 provided in the integral seal/inner cover assembly 128 and in retainer 140. Collector nail 40 is preferably a brass nail including a head 42 having a greater diameter than any other portion of collector nail 40. Retainer 140 may be formed of nylon or polypropylene or any noncorrosive material and is provided to cooperate with head 42 of collector nail 40 to secure collector nail 40 within central hole 136 of integrated seal/inner cover assembly 128.

Integrated seal/inner cover assembly 128 includes a rigid inner cover 110 and a seal 130 that is formed directly on rigid inner cover 110 by molding or lamination. Seal 130 is preferably made of neoprene, butyl, or ethylene propylene rubber, and rigid inner cover 110 is preferably formed of low-carbon steel 1008 or 1010. Because rubber is more compressible than the nylon or polypropylene materials often used in such collector assemblies, the radial compressive strength of the rigid inner cover 110 need not be as great. Thus, the inner cover need not be configured to increase its radial compressive strength, and materials other than metal may be used. Further, seal 130 may be formed of other materials provided such materials are chemically inert, water impervious, compressible, and exhibit the ability to bond to the material used to form rigid inner cover 110.

Additionally, by decreasing the radial force required to compress the peripheral upstanding wall of the seal, the thickness of the can walls may be decreased from 0.010 inch to as thin as approximately 0.004 inch. Such a reduction of can wall thickness results in an increase in internal cell volume.

Figure 8:
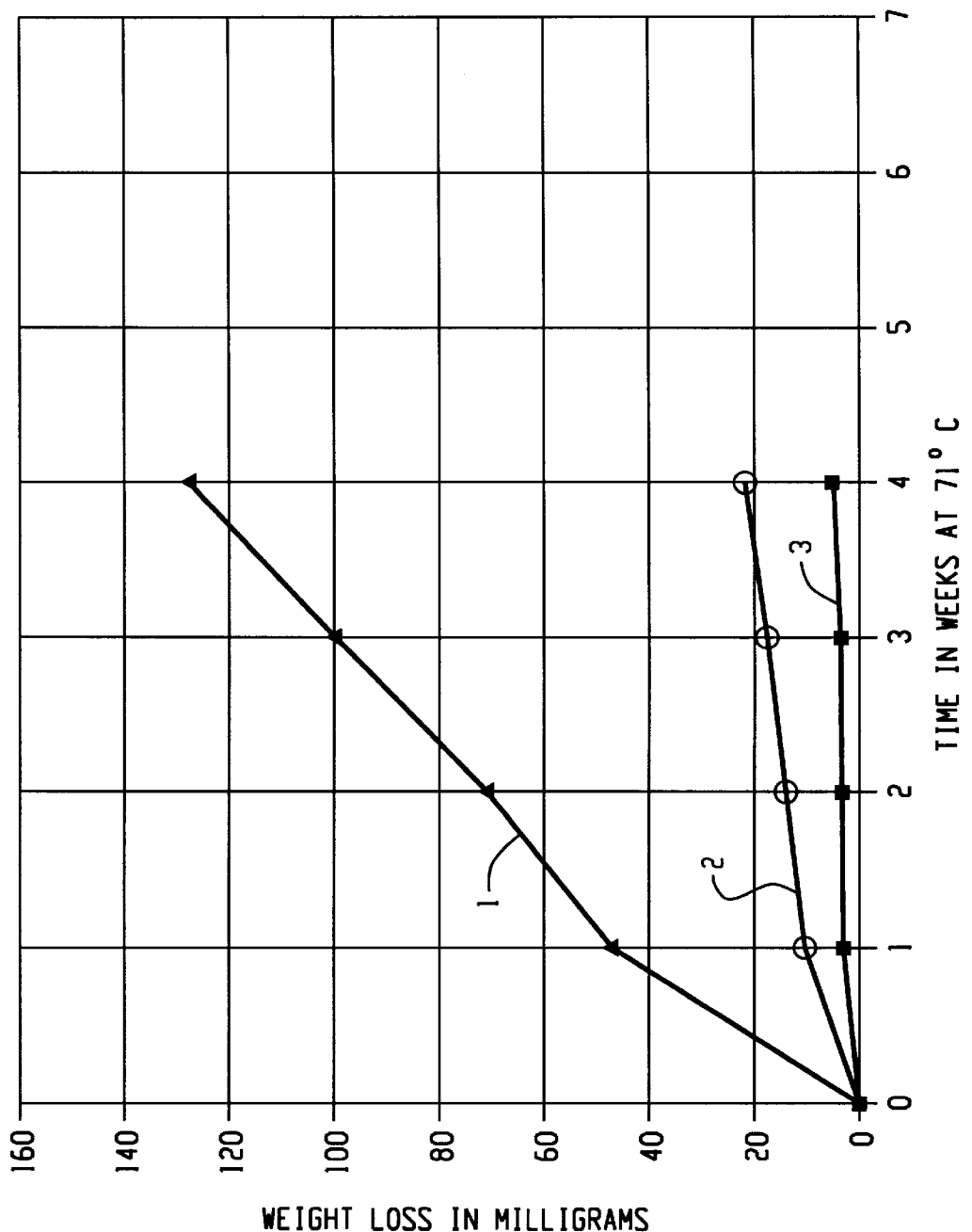
FIG. 8 is a graph comparing the water permeability of collector assemblies of the present invention and the collector assembly shown in FIG. 1.

By providing a structure that enables rubber materials such as neoprene and butyl rubber to be used as the seal material, the water permeability of the collector assembly is significantly reduced. As shown in the graph in FIG. 8, a collector assembly having a nylon seal and the construction shown in FIG. 1 exhibits the water permeability illustrated by line 1 in the graph shown in FIG. 8. Line 2 represents the water permeability of a collector assembly constructed as shown in FIG. 4 and having a seal made of neoprene rubber, while line 3 illustrates the water permeability of a collector assembly having this same structure with a seal material made of butyl rubber. As clearly shown in the graph of FIG. 8, the collector assembly of the present invention offers significant improvement in terms of lessened water permeability. By reducing the water permeability of the cell, the shelf life of the battery is accordingly significantly increased.

As shown in FIGS. 2–4, rigid inner cover 110 is generally disc shaped and has a central aperture 118 formed at its center as well as a plurality of additional apertures 117. Central aperture 118 and additional apertures 117 extend through rigid inner cover 110 from its upper surface 112 to its bottom surface 114. If formed of metal, rigid inner cover 110 is preferably produced by stamping it from a sheet of metal. Inner cover 110 may, however, be formed using other known manufacturing techniques. Subsequently, rigid inner cover 110 may be subjected to a surface roughening process, such as sandblasting or chemically etching, to enhance the strength of the bond that is subsequently formed between rigid inner cover 110 and seal 130. For a C-sized cell, rigid inner cover 110 is preferably 0.015 to 0.036 inch thick After rigid inner cover 110 has been stamped and surface treated, it is preferably inserted into a transfer mold piece into which the rubber that forms seal 130 is subsequently supplied. The transfer mold is preferably formed to allow the supplied rubber to form a layer 132 across the bottom surface 114 of rigid inner cover 110. The thickness of layer 132 is between 0.010 and 0.020 inch thick, and is preferably about 0.016 inch thick. The rubber also flows into apertures 117 to form plugs 138. Also, the rubber flows within central aperture 118 so as to line the surfaces of central aperture 118 but without completely filling the aperture so as to provide a central hole 136 into which collector nail 40 may subsequently be inserted. The diameter of central hole 136 is preferably sufficiently smaller than the diameter of collector nail 40 such that the rubber lining in central aperture 118 is significantly compressed within aperture 118 when collector nail 40 is driven in place through central hole 136. By providing a retainer 140 that is pressed against bottom layer 132 of seal 130, when collector nail 40 has been driven in place, its head 42 and retainer 140 cooperate to also vertically compress the portion of rubber layer 132 lying therebetween. By compressing the rubber seal in the vicinity of collector nail 40 in this manner, the possibility of a leak occurring in the interface between the collector nail 40 and integrated seal/inner cover assembly 128 is significantly reduced.

By filling apertures 117 with rubber seal plugs 138 in the manner shown, a pressure relief mechanism is provided that not only works reliably, but which may effectively reseal after internal pressure has been released. When the internal pressure reaches levels considered to be excessive (i.e., levels below those pressure levels at which the cell may disassemble), the excessive pressure ruptures at least one of plugs 138 to allow the expedited release of internally-generated gasses. The pressure at which such rupturing occurs is controllable based upon the materials selected for the seal, the thickness of the seal material, and the diameter of apertures 117, Further, because of the elasticity of the rubber seal material, the rubber plug 138 substantially assumes its original state once the pressure has been released. Thus, unlike other venting mechanisms used in conventional collector assemblies, the pressure relief mechanism of the present invention does not create a permanent hole within the collector assembly through which electrochemical materials may subsequently leak. Also, such resealing minimizes deterioration of the cell's internal components, thereby possibly extending the useful cell life.

Although only one aperture 117 in plug 138 need be provided to serve as a pressure relief mechanism, added reliability is obtained by providing a plurality of such plugged apertures. Unlike prior art relief mechanism structures, the present invention allows for a plurality of independently-operable pressure relief mechanisms. Even the pressure relief mechanism illustrated in FIG. 1, which includes a plurality of spurs, relies upon the inversion of washer 50 for any one of the spurs to penetrate the seal. Each of the plugged apertures provided in the collector assembly of the present invention, however, is not dependent upon one another and therefore provide for a more reliable pressure relief mechanism as a whole.

In the embodiment shown in FIGS. 2–4, seal 130 has an upstanding wall 135 formed directly on a peripheral edge 116 of rigid inner cover 110. By providing this upstanding wall 135, a sufficient seal may be created when collector assembly 125 is inserted into can 12. This seal is further enhanced by forming the outer diameter of seal 130 to be greater than the inside diameter of can 12 so that inner cover 110 compresses upstanding wall 135 against the inner surface of can 12.

Seal 130 may additionally be formed to include an extended portion 137 of upstanding wall 135 that extends vertically upward past the upper surface 112 of inner cover 110. By providing extension 137, seal 130 may be used as an electrical insulator between the crimped end 124 of can 12 and a peripheral edge of outer cover 145.

Although seal 130 is shown as including a continuous layer 132 across the entire bottom surface 114 of inner cover 110, it will be appreciated by those skilled in the art that seal 130 need not be formed over the entire bottom surface of inner cover 110, particularly if inner cover 110 is formed of a material that is chemically inert with the cell's components. Depending upon the characteristics of the materials used to form seal 130 and inner cover 110, a bonding agent may be applied to the surfaces of inner cover 110 that will come into contact and be bonded to seal material 130.

Once seal 130 has been molded to inner cover 110 and collector nail 40 is inserted through central hole 136 of integrated seal/inner cover assembly 128 and through retainer 140, outer cover 145 is placed on the upper surface 112 of collector assembly 125 and is preferably welded to head 42 of collector nail 40. Subsequently, the collector assembly 125 with the outer cover 145 attached thereto, is inserted into the open end of cell can 12 as illustrated in FIG. 4. To hold collector assembly 125 in place prior to crimping, a bead 122 may be formed about the circumference of cell can 12. Thus, collector assembly 125 may be inserted with some degree of force to ensure that the bottom layer 132 of seal 130 rests evenly within the cell can opening on bead 122. The position of bead 122 on can 12 and the length of extension 137 of seal 130 should be set such that extension 137 of seal 130 extends slightly past the end of can 12 to ensure that the end of can 12 cannot come into contact with outer cover 145.

By providing bead 122 in can 12, can 12 need only be crimped at its open end so as to provide a downward force that is countered by bead 122. This results in an axial force that seals the cell in two places: at the can bead/seal interface, and the outer cover/seal/can juncture. Thus, the higher profile crimp used in the conventional cell construction shown in FIG. 1 may be replaced with a lower profile crimp thereby creating more internal cell volume.

Figure 5:
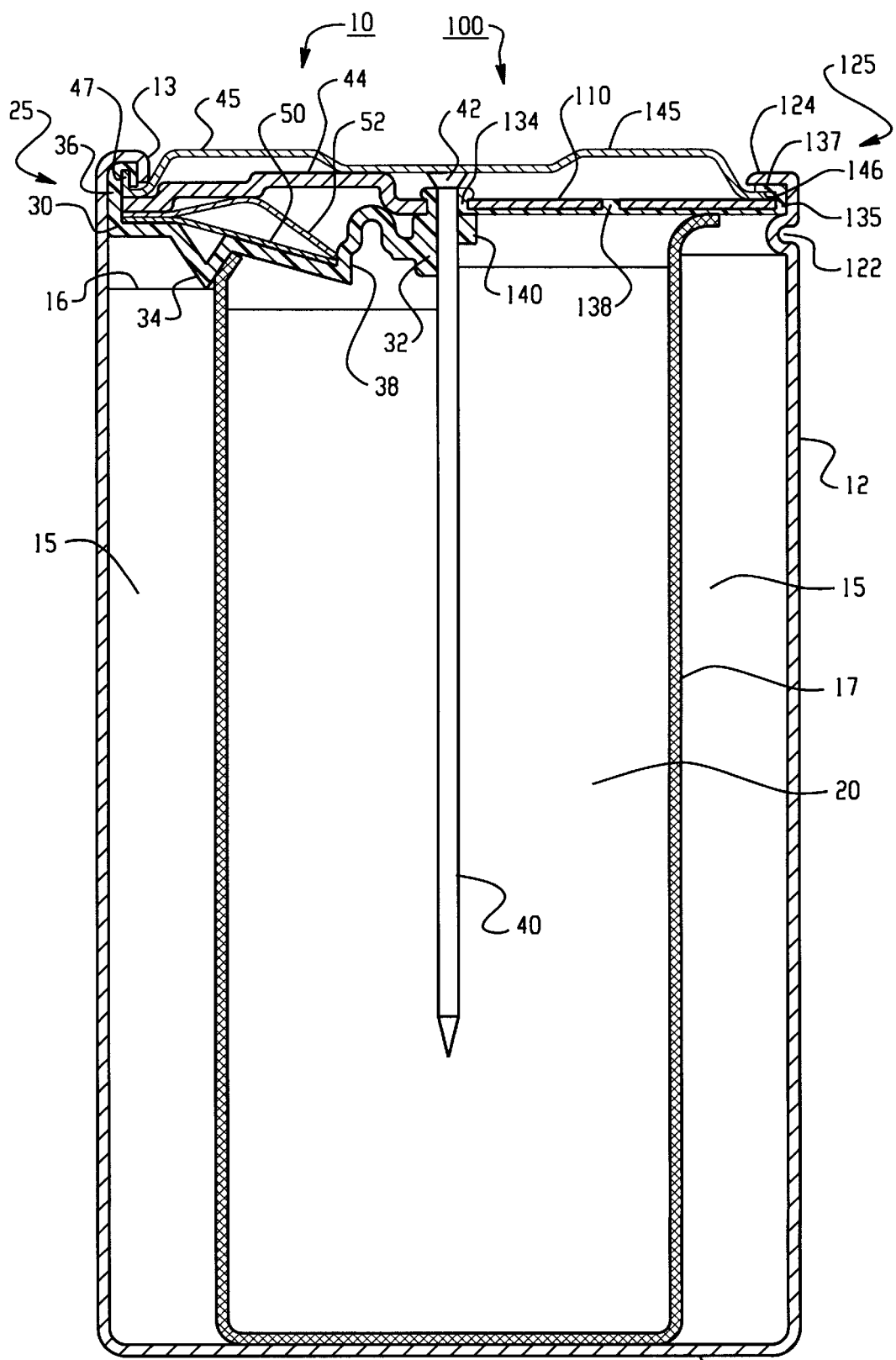
FIG. 5 is a combined cross-sectional view of both an electrochemical cell incorporating a conventional collector assembly and an electrochemical cell incorporating the collector assembly constructed in accordance with the first embodiment of the present invention.

As shown in FIG. 5, a collector assembly 125 having the construction shown in FIGS. 2–4 has a much lower profile than the conventional collector assembly as illustrated in FIG. 1. Thus, as shown in FIG. 5, a cell 100 utilizing collector assembly 125 may include greater amounts of electrochemical materials 15 and 20, and the service life of the cell is increased accordingly. For all cell sizes, the collector assembly will provide more interior cell volume. Despite its lower profile, collector assembly 125 nevertheless exhibits sufficient sealing and electrical insulation. Additionally, the collector assembly of the present invention provides a pressure relief mechanism that is not only reliable, but which provides the advantages of multiple independently-operable pressure relief mechanisms and resealing after venting to prevent the subsequent leakage of electrochemical materials from the cell. Further, the collector assembly of the present invention offers improved water permeability characteristics thereby increasing the shelf life of the battery.

Figure 6:
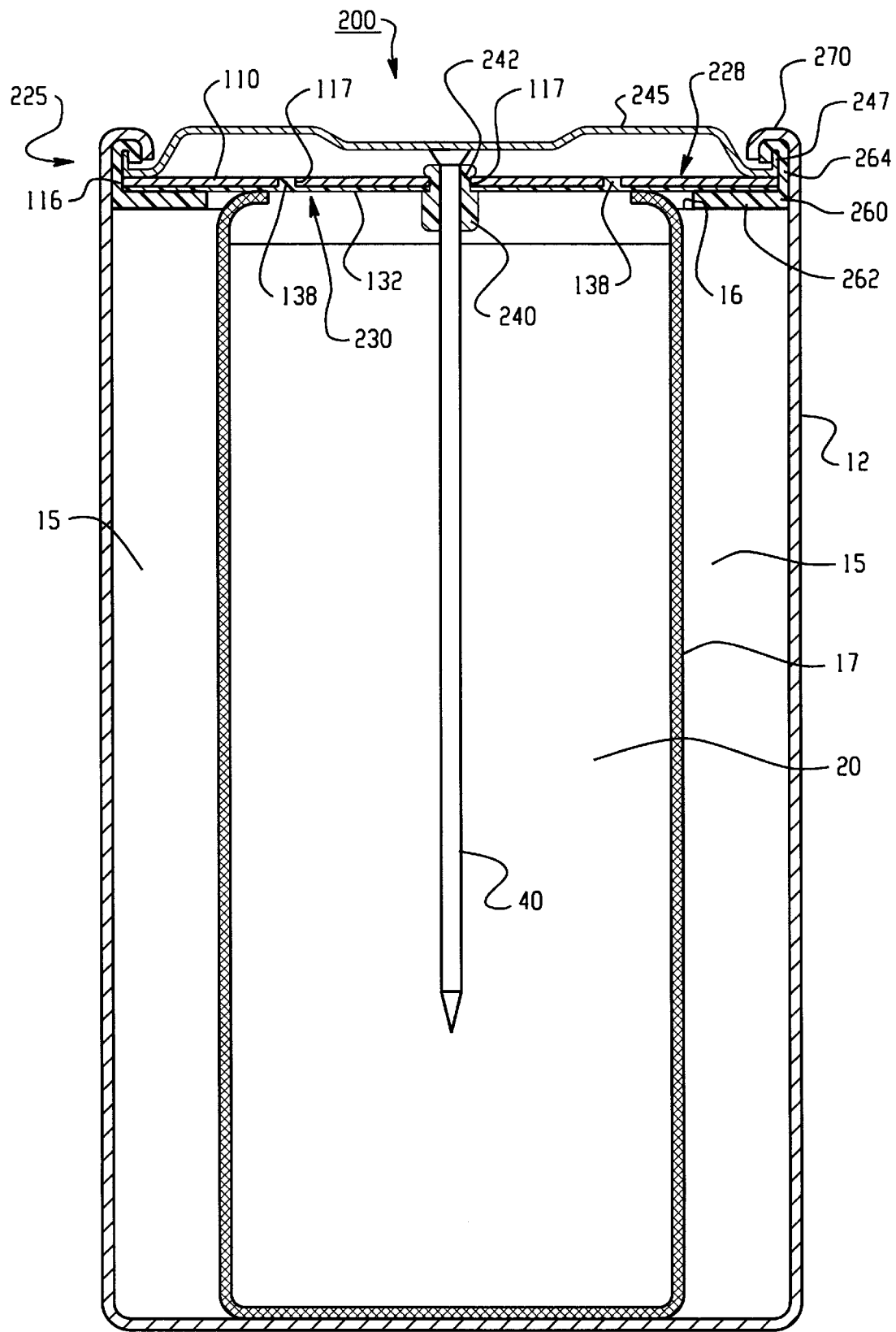
FIG. 6 is a cross-sectional view of a portion of an electrochemical cell into which a collector assembly constructed in accordance with a second embodiment of the present invention has been inserted.

FIG. 6 shows a collector assembly 225 constructed in accordance with a second embodiment of the present invention. The second embodiment differs from the first embodiment in that an annular peripheral nylon seal 260 having a general L-shaped cross section, is provided between inner rigid cover 110 and the inner surface of can 12 in lieu of the peripheral rubber upstanding wall 135 that is formed on the peripheral edge 116 of inner cover 110 in the first embodiment. Further, the can 12 of the electrochemical cell 200 in which collector assembly 225 is implemented, does not include a bead for supporting the collector assembly. Instead, peripheral nylon seal 260 includes a bottom leg 262 that extends radially inward to provide a ledge on which the integrated seal/cover assembly 228 is supported. Because peripheral nylon seal 260 does not provide much countering force for crimping the can axially downward, a crimp applying a force to pinch a peripheral vertical extension 247 of outer cover 245 is utilized. Thus, peripheral nylon seal 260 preferably includes a vertical extension 264 of sufficient length to be crimped over vertical extension 247 so as to provide electrical insulation between end 270 of can 12 and outer cover 245. An additional difference is that the nylon retainer 140 and the portion 134 of seal 130 that extends within central hole 118 are replaced with a nylon hub 240 that includes a portion 242 that extends within central hole 117.

The construction of the second embodiment may be preferred when it is desired to form the integral seal/inner cover assembly 228 by laminating inner cover 110 and seal 230 together, rather than molding them together as described above with respect to the first embodiment. It will be appreciated, however, that seal 230 could nevertheless be formed on the peripheral edge 116 of rigid inner cover 110 in the same manner as shown in the first embodiment without including any extension 137 while still being used in connection with a peripheral nylon seal 260.

By utilizing a nylon hub and a nylon L-seal in the manner shown in FIG. 6, other inert materials such as a metal foil or membrane may be applied to the bottom surface of inner cover 110. Such a metal foil would offer advantages in that it is much more impervious to water than nylon or polypropylene. The thickness of such a metal film or foil should be selected to allow venting when the internal cell pressure becomes excessive. As yet an additional advantage of using a metal foil membrane, the collector nail may be welded directly to the inner cover thereby eliminating the need for an elastomeric hub and eliminating the possibility of leakage through the inner cover/nail interface.

To support collector assembly 225 in the proper orientation within the open end of can 12 prior to crimping, lower leg 262 of peripheral nylon seal 260 is rested upon an upper surface 16 of first electrode 15. If first electrode 15 is formed by molding it in place within can 12, first electrode 15 is preferably constructed in the manner disclosed in commonly-assigned U.S. patent application Ser. No. 09/036,115 to prevent any flashing resulting from the molding of first electrode 15 from interfering with the proper alignment and seal provided by the collector assembly. The disclosure of which in U.S. patent application Ser. No. 09/036,115 is incorporated by reference herein.

Figure 7:
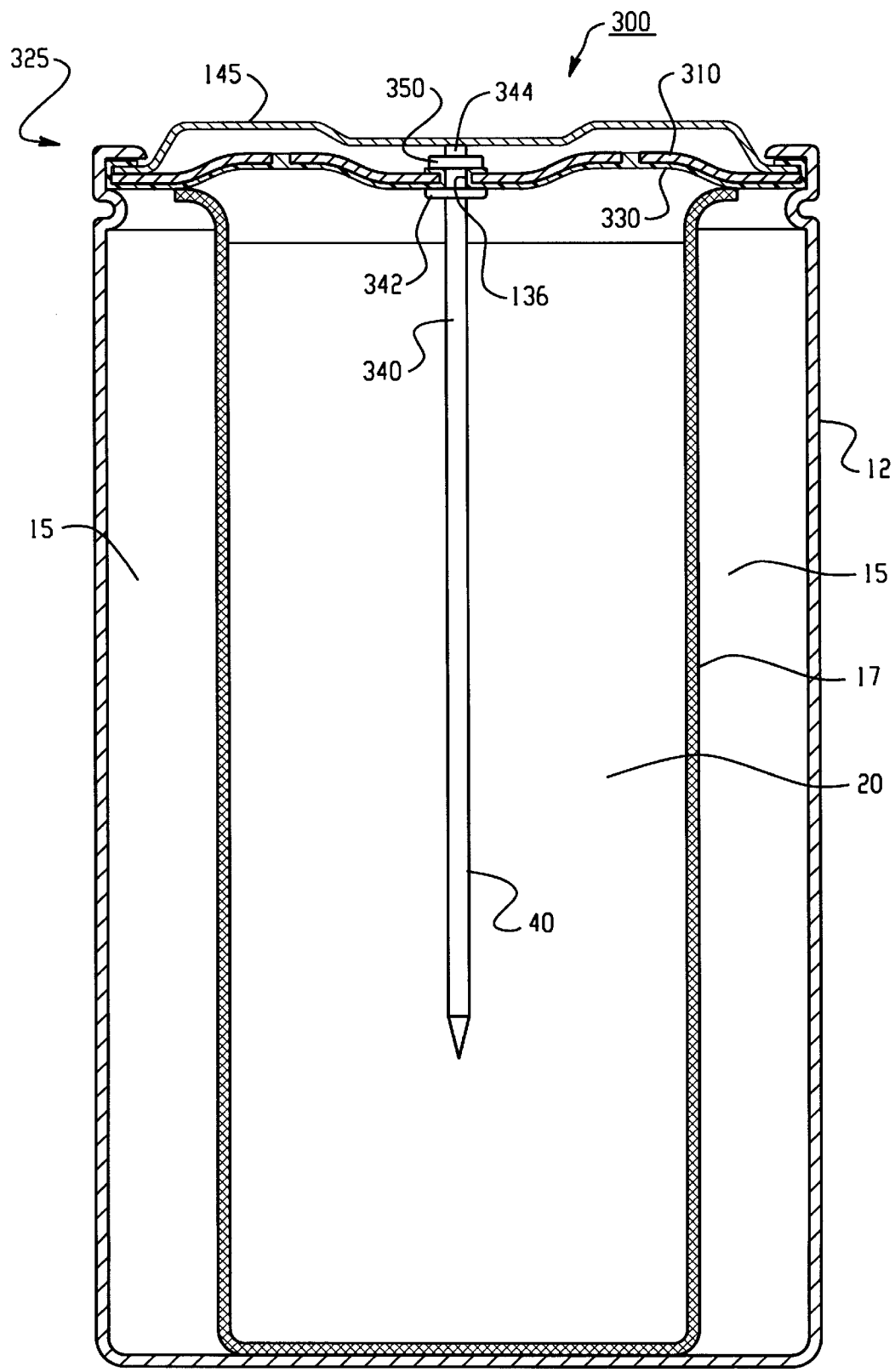
FIG. 7 is a cross-sectional view of an electrochemical cell into which a collector assembly constructed in accordance with a third embodiment of the present invention has been inserted.

A third embodiment of the present invention is shown in FIG. 7. The third embodiment is similar to the first embodiment except that the collector assembly 325 of cell 300 includes a modified collector nail 340 that has a flat head 342 with a post 344 extending upward from head 342. Such a nail construction is known as a reverse-drive nail in that it is inserted through the central hole 136 from the bottom towards the top such that post 344 extends upward through hole 136 to contact outer cover 145. To hold nail 340 in place, a connector, such as an interference fit lock washer 350, is pressed over protruding post 344.

Although the inner cover of the collector assembly of the present invention has been described in the previous embodiments as having a generally flat shape, the inner cover (310) may be contoured to more closely follow the shape of the inner surface of outer cover 145 as shown in FIG. 7 so as to further increase the internal cell volume.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An electrochemical cell comprising:
   a can for containing electrochemical materials including positive and negative electrodes and an electrolyte, said can having an open end and a closed end;
   an integral seal/inner cover assembly positioned in the open end of said can, said integral seal/inner cover assembly having an inner cover and a seal preformed and bonded directly onto at least an inner-facing surface of said inner cover;
   a collector extending through a central hole provided in said integral seal/inner cover assembly and into said can so as to contact one of the electrodes; and
   an outer cover positioned across the open end of said can proximate an outer-facing surface of said inner cover, said outer cover being positioned so as to be in electrical contact with said collector;
   wherein said inner cover includes at least one aperture extending from the inner-facing surface to the outer-facing surface of said inner cover, the aperture being filled by said seal to provide a pressure relief that relieves internal pressure from said can when the internal pressure becomes excessive.

2. The electrochemical cell as defined in claim 1, wherein said seal extends within said central hole of said inner cover to prevent leakage of the electrochemical materials from between said collector and said inner cover.

3. The electrochemical cell as defined in claim 1, wherein said seal is preformed onto a peripheral edge of said inner cover to prevent leakage of the electrochemical materials from between said inner cover and an inner surface of said can.

4. The electrochemical cell as defined in claim 3, wherein said seal extends from the peripheral edge of said inner cover past the outer-facing surface thereof to provide electrical insulation between said can and said outer cover.

5. The electrochemical cell as defined in claim 1, wherein said seal is formed of rubber.

6. The electrochemical cell as defined in claim 1, wherein said inner cover is formed of low carbon steel.

7. The electrochemical cell as defined in claim 1, wherein said seal is preformed on, and bonded to, said inner cover by molding said seal directly onto said inner cover.

8. The electrochemical cell as defined in claim 1, wherein said seal is preformed on, and bonded to, said inner cover by laminating said seal directly onto said inner cover.

9. The electrochemical cell as defined in claim 1 and further including a retainer provided around said collector proximate the inner-facing surface of said inner cover for retaining said collector within the central hole.

10. The electrochemical cell as defined in claim 1 and further including a peripheral seal disposed between a peripheral edge of said inner cover and an inner surface of said can to prevent leakage of the electrochemical materials therebetween.

11. The electrochemical cell as defined in claim 10, wherein said peripheral seal is made of nylon.

12. The electrochemical cell as defined in claim 11, wherein said seal preformed on said inner cover is made of rubber.

13. The electrochemical cell as defined in claim 1, wherein said integral seal/inner cover assembly is disc shaped.

14. An electrochemical cell comprising:
    a can for containing electrochemical materials including positive and negative electrodes and an electrolyte, said can having an open end and a closed end;
    an integral seal/inner cover assembly positioned in the open end of said can, said integral seal/inner cover assembly including a rigid inner cover having a central aperture and at least one additional aperture, and a rubber seal preformed directly onto the innermost surface of said rigid inner cover, said rubber seal further being preformed within said central aperture and within said at least one additional aperture to provide a pressure relief that relieves internal pressure from said can when the internal pressure becomes excessive;
    a collector extending through a central hole provided in the portion of said rubber seal formed within the central aperture, said collector further extending into said can so as to contact one of the electrodes; and
    an outer cover positioned across the open end of said can proximate the outermost surface of said rigid inner cover, said outer cover being positioned so as to be in electrical contact with said collector.

15. The electrochemical cell as defined in claim 14, wherein said rubber seal is preformed onto a peripheral edge of said rigid inner cover to prevent leakage of the electrochemical materials from between said rigid inner cover and an inner surface of said can.

16. The electrochemical cell as defined in claim 15, wherein said rubber seal extends from the peripheral edge of said rigid inner cover past the outermost surface thereof to provide electrical insulation between said can and said outer cover.

17. The electrochemical cell as defined in claim 14, wherein said seal is formed of one of ethylene propylene, neoprene, and butyl rubber.

18. The electrochemical cell as defined in claim 14, wherein said rigid inner cover is formed of low carbon steel.

19. The electrochemical cell as defined in claim 14, wherein said rubber seal is preformed on said rigid inner cover by molding said seal directly onto said rigid inner cover.

20. The electrochemical cell as defined in claim 14, wherein said rubber seal is preformed on said rigid inner cover by laminating said seal directly onto said rigid inner cover.

21. The electrochemical cell as defined in claim 14 and further including a retainer provided around said collector proximate the innermost surface of said rigid inner cover for retaining said collector within the central hole.

22. The electrochemical cell as defined in claim 14 and further including a peripheral seal disposed between a peripheral edge of said rigid inner cover and an inner surface of said can to prevent leakage of the electrochemical materials therebetween.

23. The electrochemical cell as defined in claim 22, wherein said peripheral seal is made of one of nylon and polypropylene.

24. The electrochemical cell as defined in claim 14, wherein said integral seal/inner cover assembly is disc shaped.

25. A method of making a collector assembly for an electrochemical cell, the method comprising the steps of:
    providing a disc-shaped rigid inner cover having a bottom surface, a central aperture, and at least one additional aperture;

molding a rubber seal directly on the rigid inner cover such that the rubber seal is molded onto a bottom surface of the rigid inner cover, within the central aperture, and within the additional aperture; and inserting a collector through a central hole provided in the portion of the rubber seal that is molded within the central aperture of the rigid inner cover.

26. An electrochemical cell comprising:

a can for containing electrochemical materials including positive and negative electrodes and an electrolyte, said can having an open end and a closed end;

an integral seal/inner cover assembly positioned in the open end of said can, said integral seal/inner cover assembly having a seal and an inner cover having a plurality of apertures extending from an inner-facing surface to an outer-facing surface of said inner cover, the apertures being filled by said seal to provide a plurality of independently operable pressure relief mechanisms;

a collector extending through a central hole provided in said integral seal/inner cover assembly and into said can so as to contact one of the electrodes; and an outer cover positioned across the open end of said can proximate an outer-facing surface of said inner cover, said outer cover being positioned so as to be in electrical contact with said collector.

* * * * *